US011969915B2

(12) United States Patent
Zhou et al.

(10) Patent No.: US 11,969,915 B2
(45) Date of Patent: Apr. 30, 2024

(54) DOUBLE PRODUCTION LINE AND RAPID PREFABRICATION PROCESS OF SEGMENTAL BEAM

(71) Applicants: CHINA RAILWAY GUANGZHOU ENGINEERING GROUP CO., LTD., Guangdong (CN); China Railway Guangzhou Engineering Group Real Estate Co., Ltd., Guangdong (CN)

(72) Inventors: Xiao Zhou, Guangdong (CN); Xiaofeng Deng, Guangdong (CN); Yongguang Chen, Guangdong (CN); Zhouyu Xie, Guangdong (CN); Gaofei Wei, Guangdong (CN); Jiawei Yang, Guangdong (CN); Ping Zhang, Guangdong (CN); Beibei Cheng, Guangdong (CN); Wenqiang Zheng, Guangdong (CN); Ying Wang, Guangdong (CN); Yuan Xu, Guangdong (CN)

(73) Assignees: CHINA RAILWAY GUANGZHOU ENGINEERING GROUP CO., LTD., Guangzhou (CN); China Railway Guangzhou Engineering Group Real Estate Co., Ltd., Guangzhou (CN)

( * ) Notice: Subject to any disclaimer, the term of this patent is extended or adjusted under 35 U.S.C. 154(b) by 269 days.

(21) Appl. No.: 17/555,522

(22) Filed: Dec. 20, 2021

(65) Prior Publication Data

US 2023/0110001 A1 Apr. 13, 2023

(30) Foreign Application Priority Data

Oct. 12, 2021 (CN) .......................... 202111186550.3

(51) Int. Cl.
*B28B 23/18* (2006.01)
*B28B 7/22* (2006.01)
(Continued)

(52) U.S. Cl.
CPC ................ *B28B 23/18* (2013.01); *B28B 7/22* (2013.01); *E01D 2/04* (2013.01); *E01D 2101/28* (2013.01)

(58) Field of Classification Search
None
See application file for complete search history.

(56) References Cited

FOREIGN PATENT DOCUMENTS

| | | | | |
|---|---|---|---|---|
| CN | 104514199 A | * | 4/2015 | .............. B66C 1/10 |
| CN | 210850743 U | | 6/2020 | |
| CN | 112265114 A | | 1/2021 | |

OTHER PUBLICATIONS

Wang CN104514199A English Translation, 2015 (Year: 2015).*
Guo CN210850743 English Translation, 2020 (Year: 2020).*
Yu CN112265114A English Translation, 2021 (Year: 2021).*

* cited by examiner

*Primary Examiner* — Jacob T Minskey
*Assistant Examiner* — Adrien J Bernard

(57) ABSTRACT

The present application disclosures a double production line and a rapid prefabrication process of a segmental beam. The double production line including two production machine and a track system provided on the construction ground; the production machine includes a fixed end mold, two side molds, a bottom mold trolley, a middle internal mold trolley and two side internal mold trolley; two side molds are positioned on two sides of the fixed end mold respectively, the fixed end mold and two side molds together define a pouring position with an end opening, two openings of the pouring position are arranged facing each other; the track system includes a transverse track and a longitudinal track (Continued)

communicated with each other, two pouring positions are both positioned in the extension path of the transverse track, and the longitudinal track is positioned between two pouring positions.

13 Claims, 5 Drawing Sheets

(51) Int. Cl.
*E01D 2/04* (2006.01)
*E01D 101/28* (2006.01)

DOUBLE PRODUCTION LINE AND RAPID PREFABRICATION PROCESS OF SEGMENTAL BEAM

CROSS-REFERENCE TO RELATED APPLICATION

This application is based on and claims the priority to Chinese patent application serial no. 202111186550.3, filed on Oct. 12, 2021. The entirety of the above-mentioned patent application is hereby incorporated by reference herein and made a part of this specification.

TECHNICAL FIELD

The present application relates to a field of prefabrication construction of a segmental beam, and, in particular, relates to a double production line of a segmental beam.

BACKGROUND ART

With the application of the prestressed concrete bridge prefabrication assembly construction method and technology, the development of the bridge undertaking in China has been greatly promoted. In the prefabrication assembly method, the main girder of the bridge is generally divided into multiple segments along the driving direction, the prefabricated beam segments are hoisted to the corresponding position, then the prestress is tensioned so that beam segments are connected into a structure that can bear the load. The segmental beam prefabrication machine is widely used in the segmental beam prefabrication.

In related technologies, the segmental beams are mostly produced on a single line, that is, a formwork is built on site on the construction ground. Demolding is carried out after the segmental beams are poured and formed, and the formed segmental beams are transported to a storage area to facilitate a subsequent bridge construction.

In view of the above related technologies, the following deficiency is found: the single line production has a low efficiency, and delays a bridge construction process during prefabrication, which can be improved.

SUMMARY

In order to improve the efficiency of a beam prefabrication, the present application provides a double production line of a segmental beam and a rapid prefabrication process of a segmental beam.

The double production line and rapid prefabrication process of the segmental beam provided in the present application adopt the following technical solution:

a double production line of a segmental beam includes two production machines and a track system provided on a construction ground; the production machine includes a fixed end mold, two side molds, a bottom mold trolley, a middle internal mold trolley and two side internal mold trolley; the two side molds are positioned on two sides of the fixed end mold respectively, the fixed end mold and two side molds together defines a pouring position with an end opening, and the end openings of the two pouring position are arranged facing each other; the track system includes a transverse track and a longitudinal track communicated with each other, both of the two pouring positions are positioned in an extension path of the transverse track, and the longitudinal track is positioned between two pouring positions; the bottom mold trolley is slidable in the track system; a middle groove and two side grooves run through the fixed end mold horizontally, the middle internal mold trolley penetrates through the middle groove and is inserted into the pouring position, the side internal mold trolley penetrates through the side groove and is inserted into the pouring position, and the end opening of the pouring position is closed via an end formwork; and, in either of the production machines, the fixed end mold, the two side molds, the bottom mold trolley, the middle internal mold trolley and the two side internal mold trolleys together define a pouring cavity in the pouring position.

In the above technical solution, after pouring the segmental beam, the end formwork can be firstly removed, and then the side internal mold and the middle internal mold can be wholly demoulded by moving the trolleys. At the same time, the segmental beams can be transported by moving the bottom mold trolley. In addition, the poured and formed segmental beam can serve as an end formwork to close the end opening of the pouring position in a subsequent pouring operation, which further reduces the time wasted in the demolding step. Further, arranging the end openings of the pouring positions of two production machine facing each other facilitates sliding the bottom mold trolley into the longitudinal track in the middle along the transverse track, and then moving to the storage area along the transverse track. By designing the paths of the track system in this way, the segmental beams can be continuously, orderly and alternatively removed out of the two production machines, thereby improving the production efficiency.

In some embodiments, the side internal mold trolley includes a side trolley, a horizontal frame provided on an upper end of the side trolley and four side formwork components, and a length direction of the horizontal frame is in line with a sliding direction of the side trolley; four side formwork components are circumferentially distributed around the horizontal frame by taking the length direction of the horizontal frame as an axis, and the horizontal frame is provided with a side driving member configured to drive the four side formwork components to gather together or depart from each other; and, when the four side formwork components depart from each other, the four side formwork components are spliced with each other to form a side internal mold.

In the above technical solution, the four side formwork components are gathered driven by the side driving member, so that the demolding operation of the internal mold can be finished inside the segmental beam in advance, which facilitates removing the side internal mold. In addition, when the side internal mold is positioned in the pouring position, the four side formwork components are gathered to reduce the space occupied by the side internal mold, and facilitate the side internal mold to pass through the side groove, avoiding a collision with the end mold during positioning.

In some embodiments, the middle internal mold trolley includes a middle trolley, a supporting frame provided on a top end of the middle trolley, a middle movable internal mold assembly and a middle fixed internal mold assembly; and a gap is provided at the pouring position between the middle movable internal mold assembly and the middle fixed internal mold assembly, and configured to form a reinforcing rib inside a middle chamber of the segmental beam when pouring the segmental beam.

Since the middle internal mold chamber has a large cavity, it is needed to reinforce the middle chamber structure during prefabricating a large area bridge section. In the above technical solution, the middle internal mold is divided into the middle movable internal mold assembly and the middle fixed internal mold assembly, so that the concrete can form the reinforcing rib in the gap therebetween during pouring, which facilitate specifically improving the structural strength of the prefabricated beam.

In some embodiments, the middle movable internal mold assembly includes a concave inner plate, a top internal formwork, a bottom internal formwork and two side internal formworks, the inner plate is snap connected with the supporting frame slidably, a middle driving member is provided in the inner plate and configured to drive the top internal formwork, the bottom internal formwork and two side internal formworks to gather together or depart from each other; and, when the top internal formwork, the bottom internal formwork and two side internal formworks depart from each other, the top internal formwork, the bottom internal formwork and two side internal formworks are spliced with each other to form a middle internal mold.

In the above technical solution, the middle formworks are divided into a top internal formwork, a bottom internal formwork and two side internal formworks, and the four formworks are gathered together and depart from each other driven by the middle driving member, so that the demolding operation can be conducted while demoulding the side internal mold, which facilitates a subsequently removing and improves the demolding efficiency.

In some embodiments, a pulley assembly is provided on a bottom wall of the inner plate, and the pulley assembly is slidable along an extension direction of the supporting frame.

In the above technical solution, the pulley assembly is provided on the bottom wall of the inner plate. In cooperation with the pulley assembly and the supporting frame, the supporting frame can be used as a guiding track to assist in positioning the middle movable internal mold assembly in place, so as to improve the mounting efficiency of the middle internal mold.

In some embodiments, the construction ground is provided with a recess, the recess is positioned outside the pouring position, a lifting platform is provided in the recess, and the lifting platform lifts the middle movable internal mold assembly to a same height as the supporting frame; and, when the supporting frame wholly passes through the middle groove, a front end of the supporting frame is moved to directly above the recess and the front end of the supporting frame is snap connected with the inner plate slidably.

In the above technical solution, the movement of the middle movable internal mold assembly from bottom to top is realized with the help of the lifting platform, which greatly shortens a moving path of the middle movable internal mold assembly, and ensures a more labor-saving and stable transportation. In combination with the vertical movement of the middle movable internal mold assembly and the horizontal movement of the supporting frame, it only needs to mark the storage position of the middle movable internal mold assembly on the lifting platform in advance to realize a precise docking of the supporting frame with the middle movable internal mold assembly. This is conductive to improve the mounting efficiency of the middle movable internal mold assembly.

In some embodiments, there are four pulley assemblies, the pulley assembly includes a connecting rod hinged inside the inner plate, a universal wheel mounted on the moving end of the connecting rod and an obliquely supporting cylinder hinged inside the inner plate, a piston rod of the obliquely supporting cylinder is hinged with the connecting rod, the obliquely supporting cylinder is configured to retract or stretch the connecting rod, and, when the connecting rod is in a stretched state, the middle movable internal mold assembly are supported away from the construction ground by four connecting rods.

The middle movable internal mold assembly has a large volume and suffers from inconvenient moving. In the above technical solution, the pulley can serve the function of facilitating the movement of the middle movable internal mold assembly either in a retracted state or a stretched state. It is slidably connected with supporting frame, and can be moved on the construction ground, so as to improve the adaptability of the middle movable internal mold assembly.

In some embodiments, the track system covers a surface of the lifting platform, and, when the surface of the lifting platform is moved to be flush with the construction ground, the track system of the lifting platform is docked with a track system of the construction ground.

In the above technical solution, the combination of the ground and the lifting platform is realized, so that the track system can play a role of guiding, which is conductive for the middle movable internal mold assembly to be positioned in place in the lifting platform.

A rapid segmental beam prefabrication process using a double production line of a segmental beam includes the following steps:

- S1: mounting a track system, side molds and a fixed end mold: anchoring the track system on a construction ground and on a surface of a lifting platform, in which a transverse track and a longitudinal track are crossed and docked with each other; and then fixing the fixed end mold on an extension path of the transverse track, so that the two side molds and the fixed end mold together defines a pouring position;
- S2: positioning a bottom mold trolley in place and hoisting a rebar cage: moving the bottom mold trolley to the pouring position along an extension direction of the track system, and placing a prefabricated rebar cage on a top surface of the bottom formwork;
- S3: positioning a middle internal mold trolley and a side internal mold trolley in place;
- S4: closing an end opening of the pouring position and pouring the segmental beam: pouring a first segmental beam in two production machines by taking a fixed end mold of one production machine as an end formwork for the end opening of the pouring position in the other production machine, and pouring a subsequent segmental beam by using a previous poured and formed segmental beam as the end formwork to form a circumferentially closed pouring cavity;
- S5: demolding the segmental beam; and
- S6: removing the segmental beam: after pouring the segmental beam, removing poured and formed segmental beams out of the pouring position in two production machines successively by a bottom mold trolley, and moving the poured and formed segmental beam to a storage area along a longitudinal track.

In the above technical solution, two production machines pour the segmental beams successively, and remove the segmental beams successively, so that the segmental beams are continuously, orderly and alternatively removed, which is conductive to improve the production efficiency. In addition, when pouring the first segmental beam, one segmental beam is produced in one production machine by using the fixed end mold in the other production machine, and, when pouring segmental beams in a subsequent step, the poured and formed segmental beam is taken as the end formwork. Therefore, there is no need to additionally produce an end formwork, and there is a higher matching between adjacent segmental beams, which is conducive to improve the construction quality of the bridge.

DETAILED DESCRIPTION

The present application is further described in details below in connection with FIGS. 1-5.

Figure 1:
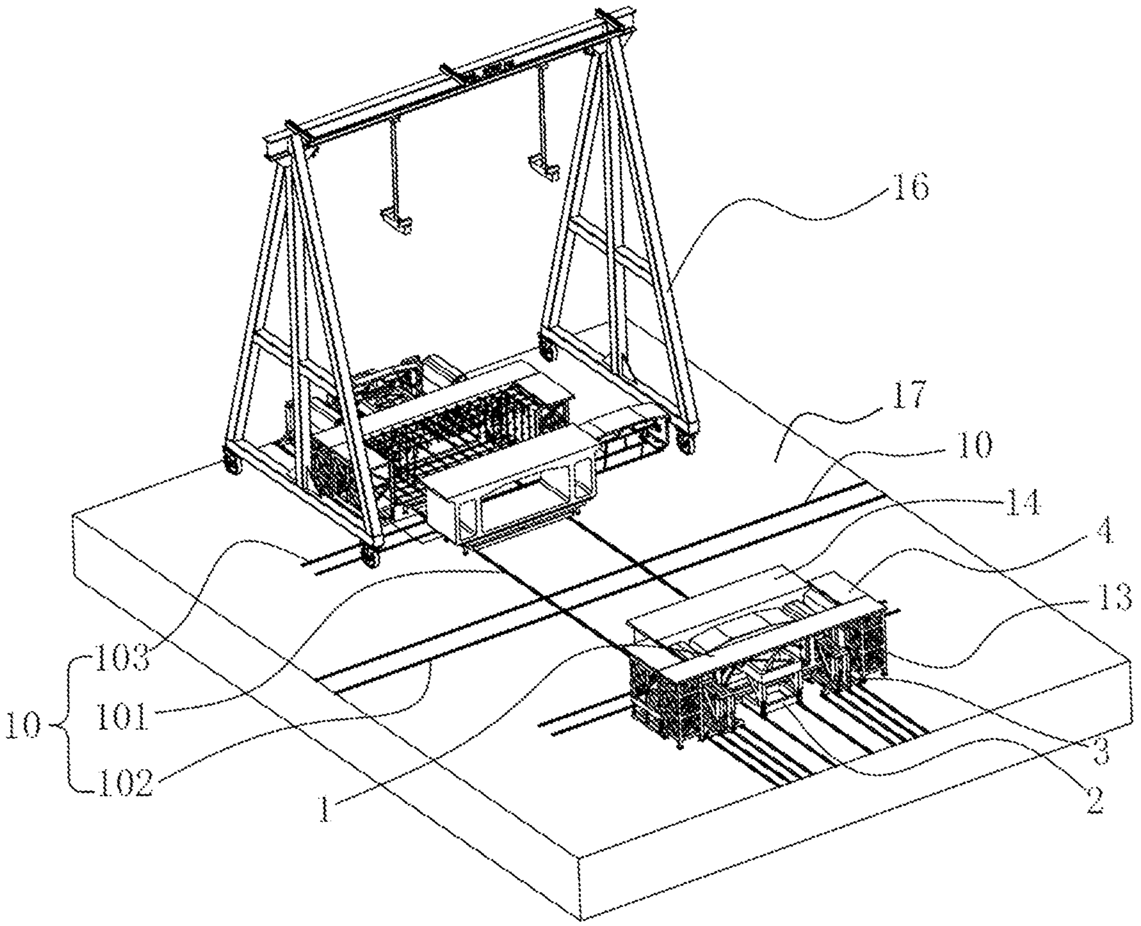
FIG. 1 is an overall structural schematic diagram of a double production line of a segmental beam in an embodiment of the present application.

An embodiment of the present application disclosures a double production line of a segmental beam. Referring to FIG. 1, the double production line of a segmental beam includes two production machines and a track system 10. The production machine includes a fixed end mold 1, two side molds 4, a bottom mold trolley 9, a middle internal mold trolley 2 and two side internal mold trolleys 3.

The track system 10 includes a transverse track 101 and a longitudinal track 102, which are communicated with each other. The track system 10 is anchored on site on a construction ground 17.

Two pouring positions 5 are positioned in an extension path of the transverse track 101, and the longitudinal track 102 is positioned between two pouring positions 5. Two production machines are both positioned in an extension path of the transverse track 101. An end of the longitudinal track 102 is faced towards a storage area of the segmental beam 14. The middle internal mold trolley 2 and two side internal mold trolleys 3 are all slidable in the transverse track 101 on a back of the fixed end mold 1. The bottom mold trolley 9 is slidable in the transverse track 101 between two production machines. A junction of the longitudinal track 102 and the transverse track 101 acts as a transfer point, so that the poured and formed segmental beam 14 can be slided out of the production machine along the transverse track 101, and transferred to the longitudinal track 102, facilitating moving the segmental beam 14 towards the storage area.

Figure 2:
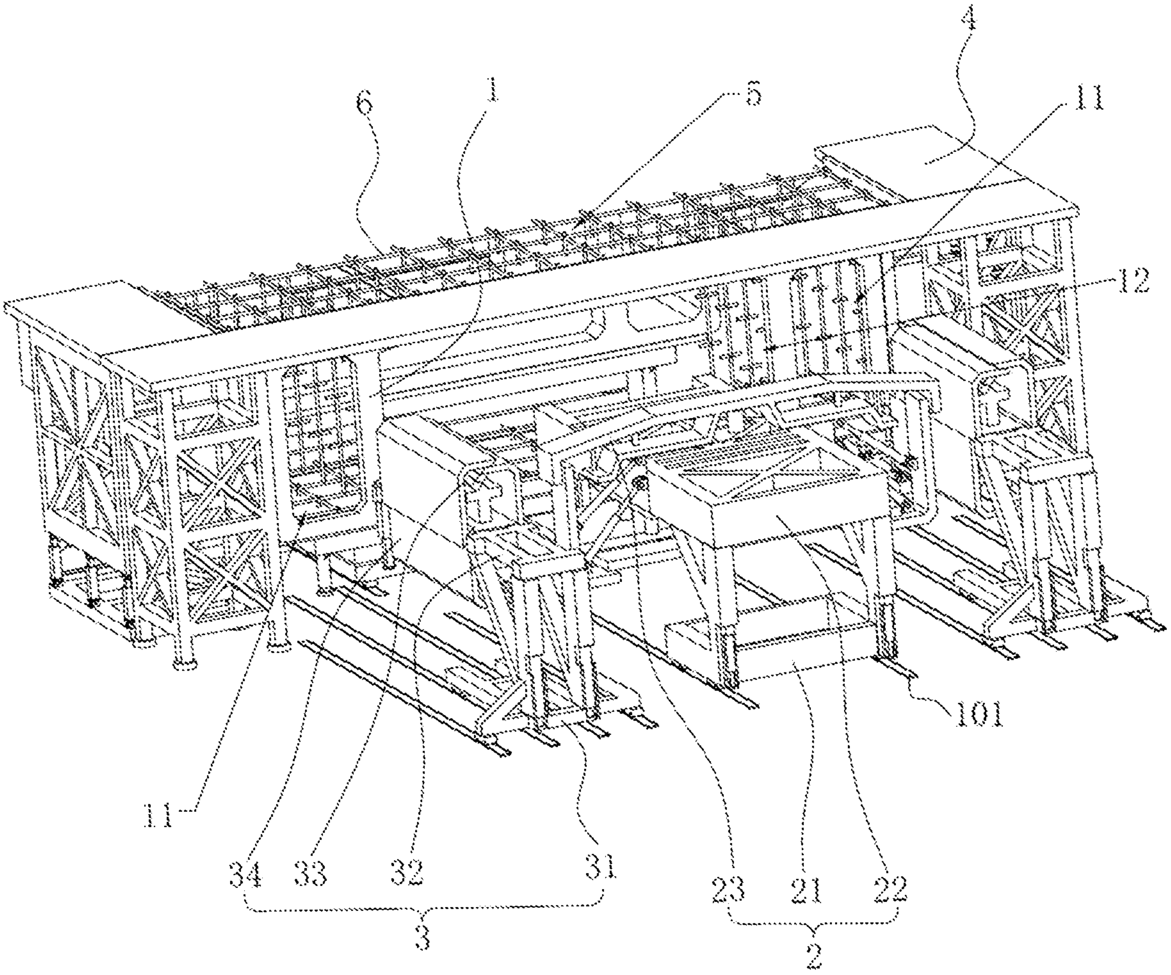
FIG. 2 is a schematic state diagram of a middle internal mold trolley and the middle movable internal mold assembly before positioning in an embodiment of the present application.
Figure 3:
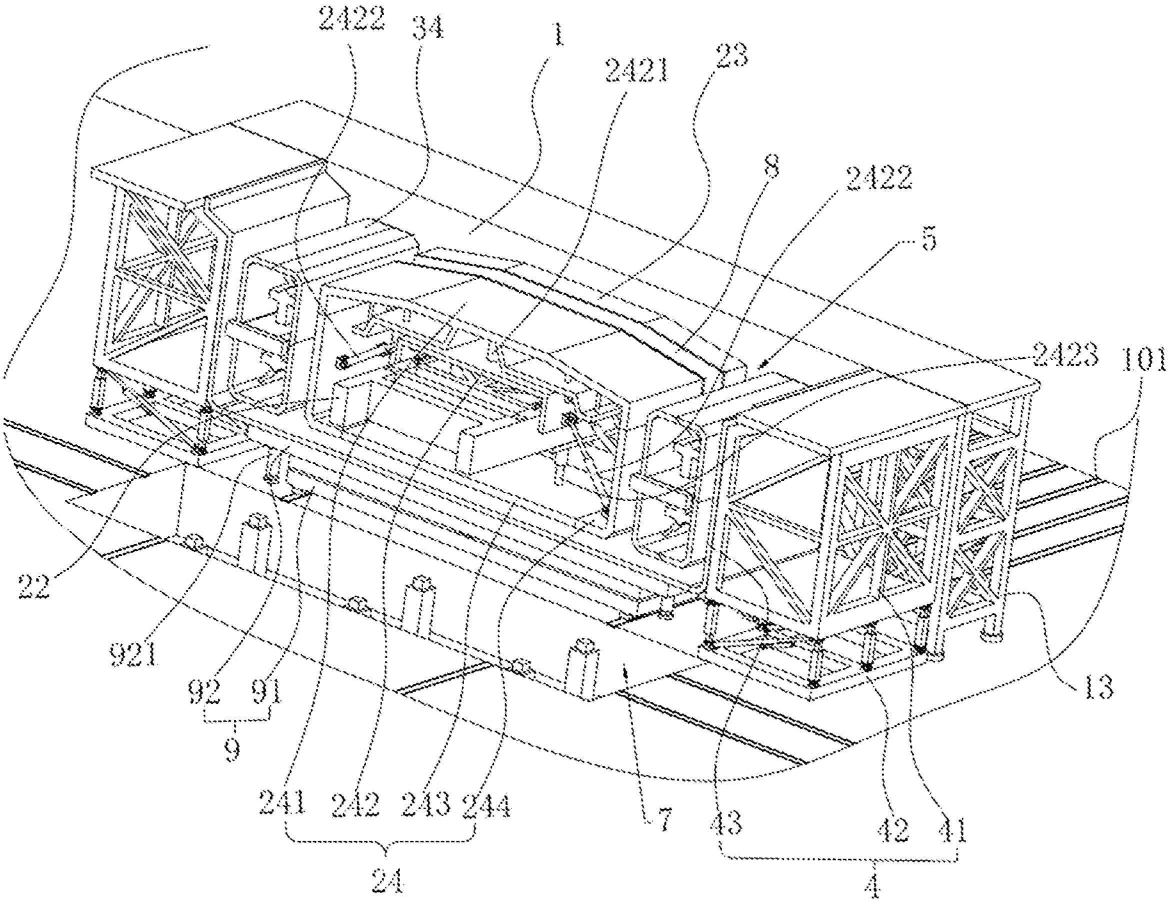
FIG. 3 is a schematic state diagram of a double production line of a segmental beam after hiding the lifting platform and the bottom mold trolley in an embodiment of the present application.

Referring to FIG. 2 and FIG. 3, the fixed end mold 1 is anchored on the ground using a truss 13. Two side molds 4 are both fixed on a front surface of the fixed end mold 1, and two side molds 4 are positioned on two sides of the end mold respectively. The side mold 4 includes a base 42 fixed on the ground, a mounting frame 41 and a side formwork 43. The side formwork 43 is mounted on one side of the mounting frame 41. Two side formworks 43 are arranged facing each other. The mounting frame 41 is connected with the base 42 via a cylinder, so as to realize lifting of the bottom mold. The mounting frame 41 and the base 42 are respectively hinged with the cylinder. In addition, a group of diagonal cylinder is provided between two adjacent groups of cylinders. Two ends of the diagonal cylinder are hinged with the mounting frame 41 and base 42, so as to realize a left-right adjustment of the side mold 4. The fixed end mold 1 and two side molds 4 defines a pouring position 5 together. The pouring operation of the segmental beam 14 is conducted in the pouring position 5.

A middle groove 12 positioned in the middle and two side grooves 11 positioned on two sides of the fixed end mold 1 respectively run through the fixed end mold 1 horizontally. The middle internal mold trolley 2 and two side internal mold trolley 3 are positioned on a back surface of the fixed end mold 1. The middle internal mold trolley 2 penetrates through the middle groove 12 along an extension direction of the transverse track 101 and extends into the pouring position 5. The side internal mold trolley 3 penetrates through the side groove 11 along the extension direction of the transverse track 101 and extends into the pouring position 5.

The bottom mold trolley 9 includes a bottom trolley and a bottom formwork 92 positioned on a top end of the bottom trolley. The bottom trolley includes two stacked steel frames 91. The bottom formwork 92 is fixed on an end surface of the upper steel frame 91, and two steel frames 91 can slide relative to each other. A transverse cylinder and a longitudinal cylinder are mounted between two steel frames 91, so that the upper steel frame 91 can be adjusted transversely and longitudinally, further to realize a horizontal adjustment of the bottom formwork 92. In addition, a plurality of vertical jacks 921 are mounted on a lower end surface of the bottom formwork 92, so as to realize a vertical adjustment of the bottom formwork 92.

For pouring the segmental beam 14, the bottom mold trolley 9 is slided into the pouring position 5 towards the front of the fixed end mold 1. Then, a rebar cage 6 is hoisted and placed on an upper end surface of the bottom mold. Two groups of side internal mold trolleys 3 and a middle internal mold trolley 2 are inserted into the pouring position 5 towards a back surface of the fixed end mold 1. Then an open end of the pouring position 5 is closed with a steel formwork 8 acting as an end formwork, so as to facilitate the pouring and forming of the segmental beam 14.

In order to facilitate a demoulding operation after pouring, the present application further improves the middle internal mold trolley 2 and the side internal mold 3.

Referring to FIG. 1 and FIG. 2, the side internal mold trolley 3 includes a side trolley 31, a horizontal frame 32 provided on an upper end of the side trolley 31 and four side formwork components 34. A length direction of the horizontal frame 32 is in line with the sliding direction of the side trolley 31. Four side formwork components 34 are spliced into a side internal mold with enclosed circumference. Four groups of diagonal cylinders are provided on the horizontal frame 32, and act as a side driving member to pull the four side formwork components 34 inwardly and push them outwardly. Four groups of diagonal cylinders 33 are stretched and retracted relative to four corners of the side internal mold respectively. Four groups of diagonal cylinders 33 are in one-to-one corresponding to the four side formwork components 34. A piston rod of the cylinder is fixed at a corner of a corresponding side formwork component 34. For demoulding, four side formwork components 34 are gathered towards the horizontal frame 32 under a retraction force of the diagonal cylinders 33, which is conductive to the separation of the formwork from the segmental beam 14, facilitating the demoulding.

In addition, splicing portions of the side formwork component 34 are provided with an oblique surface to facilitate splicing. For gathering the side internal molds inwardly, firstly, one group of two side formwork components 34 positioned at two diagonally opposite corners are pulled toward each other, and then the other group of two side formwork components 34 positioned at two other diagonally opposite corners are pulled toward each other. This is conducive to improving the retracting of the side internal mold.

Figure 4:
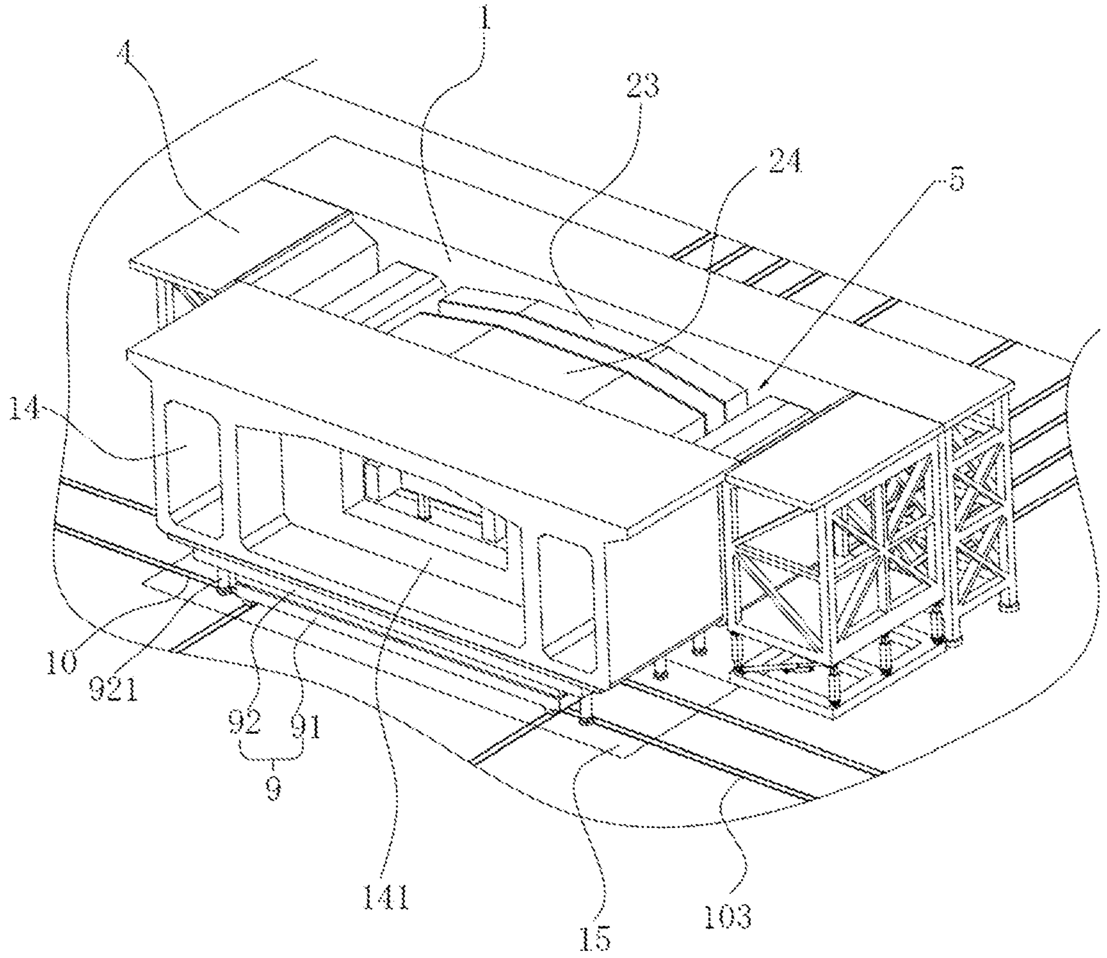
FIG. 4 is a schematic state diagram of a double production line of a segmental beam to be poured in an embodiment of the present application.
Figure 5:
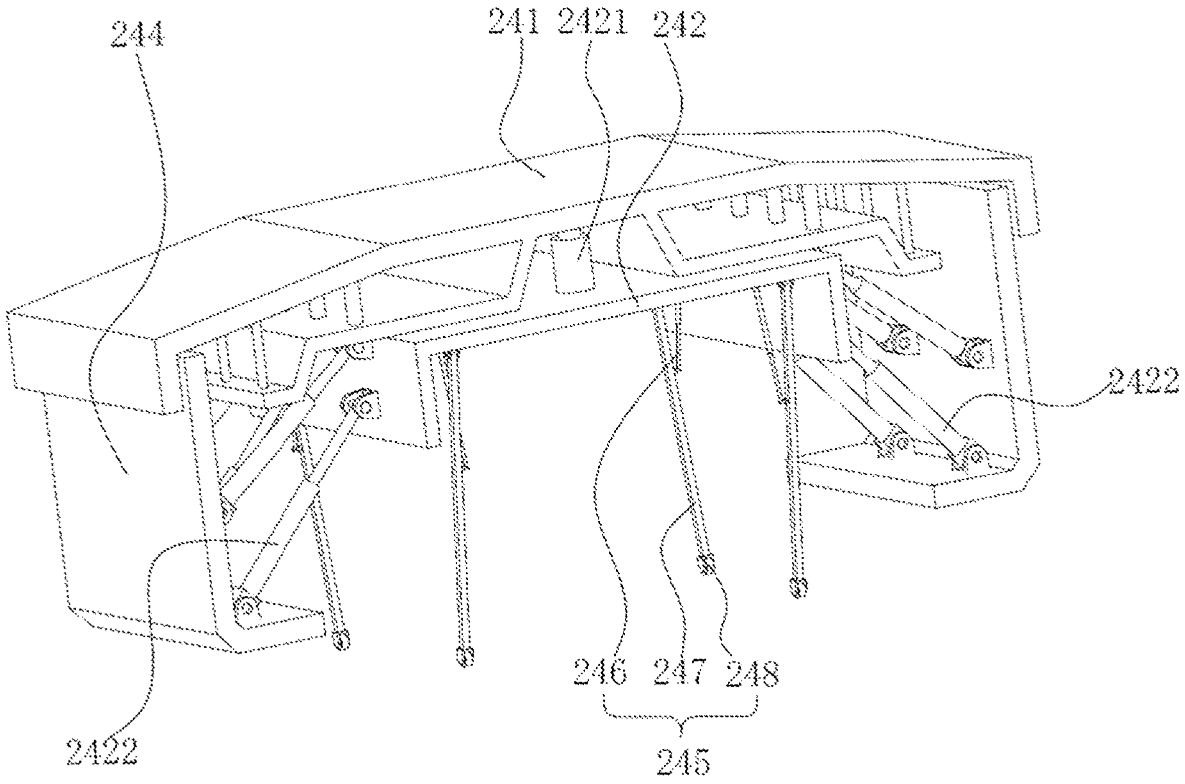
FIG. 5 is a structural schematic diagram of the middle movable internal mold assembly of the double production line of a segmental beam in an embodiment of the present application.

Referring to FIG. 3 and FIG. 4, the middle internal mold trolley 2 includes a middle trolley 21, a supporting frame 22 provided on a top end of the middle trolley 21, a middle movable internal mold assembly 24 and a middle fixed internal mold assembly 23. The supporting frame 22 is horizontally arranged. The middle fixed internal mold assembly 23 is fixed on the supporting frame 22, and inserted into the pouring position 5 from a back surface of the fixed end mold 1 together with the supporting frame 22. After the supporting frame 22 enters the pouring position 5, the middle movable internal mold assembly 24 is placed on the supporting frame 22 from the front of the fixed end mold 1. When pouring the segmental beam 14, a gap exists between the middle movable internal mold assembly 24 and the middle fixed internal mold assembly 23, so as to form a loop reinforcing rib 141 inside a middle chamber of the segmental beam 14, which is conductive to improve a structural strength of the segmental beam 14.

It should be noted that, both of the middle movable internal mold assembly 24 and the middle fixed internal mold assembly 23 have the same structure, and can realize the functions of retracting and stretching out. The middle movable internal mold assembly 24 is described below, and the structure of the middle fixed internal mold assembly 23 will not be described in detail.

Referring to FIG. 2 and FIG. 4, the middle movable internal mold assembly 24 includes a concave inner plate 242, a top internal formwork 241, a bottom internal formwork 243 and two side internal formworks 244. When the supporting frame 22 wholly penetrates through the middle groove 12, the supporting frame 22 gets out of the pouring position 5. The inner plate 242 acts as a base of the middle movable internal mold assembly 2, The inner plate 242 is snap connected in the supporting frame 22 slidably, and can be delivered into the pouring position 5 along an extension direction of the supporting frame 22. The supporting frame 22 acts as a guiding track to assist in positioning the middle movable internal mold assembly 24 in place.

A top cylinder 2421 is fixed on a top end surface of the inner plate 242, and a piston rod of the top cylinder 2421 is fixed to the top internal formwork 241. The lifting adjustment function of the top internal formwork 241 can be realized driven by the top cylinder 2421.

Each side of the inner plate 242 is hinged with two side cylinders 2422, and two side cylinders 2422 on the same side are distributed vertically. Ends of two side cylinders 2422 on the same side away from the inner plate 242 are hinged on an inner side of the side internal formwork 244 on the same side. Extension lines of two side cylinders 2422 on the same side intersect with each other, so that two side cylinders 2422 are not parallel to each other. By simultaneously driving two side cylinders 2422 on the same side, a left-right adjustment of the side internal formwork 244 can be realized.

A plurality of bottom cylinder 2423 are fixed on a bottom end of the supporting frame 22. The piston rod of the bottom cylinder 2423 is fixed on the top of the bottom internal formwork 243. Driven by the bottom cylinder 2423, a lifting adjustment function of the bottom internal formwork 243 can be realized.

In summary, the top cylinder 2421, the side cylinder 2422 and the bottom cylinder 2423 form a middle driving assembly. Driven by the middle driving assembly, the top cylinder 2421, the side cylinder 2422 and the bottom cylinder 2423 are gathered toward the supporting frame 22 successively, which is conductive to the demoulding after pouring the segmental beam 14.

Different from the middle fixed internal mold assembly 23, the middle moving internal mold 24 is mounted with a pulley assembly 245, so as to improve the mounting efficiency of the middle movable internal mold assembly 24.

Referring to FIG. 2 and FIG. 4, in this embodiment, there are four pulley assemblies 245. The pulley assembly 245 includes a connecting rod 247 hinged inside the inner plate 242, a universal wheel 248 mounted on a movable end of the connecting rod 247 and a obliquely supporting cylinder 246 hinged inside the inner plate 242. A piston rod of the obliquely supporting cylinder 246 is hinged with the connecting rod 247. The obliquely supporting cylinder 246 acting as a driving member is used to retract or stretch the connecting rod 247. When the connecting rod 247 is in a retracted state, the connecting rod 247, the obliquely supporting cylinder 246 and a bottom wall of the inner plate 242 define an obtuse triangle. Four universal wheels are provided near the bottom wall of the inner plate 242, so as to reduce the friction between the inner plate 242 and the supporting frame 22, and facilitate moving the middle movable internal mold assembly 24 into the pouring position 5. For folding up two adjacent pulley assemblies 245 on a same side, two connecting rods 247 are swung to approach each other, so that two connecting rods 247 on the same side are crossed with each other, which reduces space occupied by the pulley assembly 245 while facilitating positioning the middle internal mold assembly 24 in place.

In addition, a length of the connecting rod 247 is larger than a height of the middle fixed internal mold assembly 23. The connecting rod 247 is driven to swing downward by the extending of the obliquely supporting cylinder 246, so that the connecting rod 247 is in a supporting state, and lifts the middle movable internal mold assembly 24 from the construction ground. The obliquely supporting cylinder 246 and the bottom wall of the inner plate 242 defines an acute triangle at this time, which is conductive to a stable movement of the middle movable internal mold assembly 24.

In order to improve the mounting efficiency of the middle movable internal mold assembly 24, a recess 7 is provided on the construction ground, and positioned outside the pouring position 5. After the supporting frame 22 is wholly inserted into middle groove 12, the supporting frame 22 is positioned above the recess 7. A lifting platform 15 is mounted in the recess 7. The lifting platform 15 can be moved vertically. The lifting platform 15 is configured to lift the middle movable internal mold assembly 24, so as to lift the middle movable internal mold assembly 24 to a same height as the supporting frame 22, which facilitates delivering the middle movable internal mold assembly 24 into the pouring position 5. In addition, the track system 10 covers a surface of the lifting platform 15. When the surface of the lifting platform 15 is moved to be flush with the construction ground, the track system 10 of the lifting platform 15 is docked with the track system 10 of the construction ground. The lifting platform 15 acts as a transition platform, to facilitate the movement of the bottom mold trolley 9 and the middle movable internal mold assembly 24 during pouring.

In addition, the track system 10 further includes a temporary track 103, which is parallel to the longitudinal track 102. The temporary track 103 is docked with the track system 10 of the lifting platform 15, which facilitates the storing of the middle movable internal mold assembly 24 in the temporary track 103.

A fully automatic prefabrication production machine of a segmental beam according to an embodiment of the present application can be implemented by the following steps.

S1: Mounting the Track System 10 and the Fixed End Mold 1

A track system 10 is anchored on the construction ground and on the surface of the lifting platform 15 via an embedded member, in which the track system 10 is designed according to a moving track of the middle internal mold trolley 2, the side internal mold trolley 3 and the bottom mold trolley 9. A transverse track and a longitudinal track are crossed and docked with each other, and then the fixed end mold 1 is fixed on the extension path of the transverse track 101 via a truss 13.

S2: Positioning the Bottom Mold Trolley 9 in Place and Hoisting the Rebar Cage 6

For prefabricating the segmental beam 14, the bottom mold trolley 9 is moved to the pouring position 5 along the extension direction of the transverse track 101, so that the bottom formwork 92 abuts against the front of the fixed end mold 1 hermetically. Then the prefabricated rebar cage 6 is hoisted and placed on the top surface of the bottom formwork 92 via a gantry crane 16, and then the positions of the bottom formwork 92 and rebar cage 6 are adjusted via the transverse cylinder, the longitudinal cylinder and the vertical jack 921.

S3: Positioning the Middle Internal Mold Trolley 2 and the Side Internal Mold Trolley 3 in Place The middle internal mold assembly 24 is moved onto the lifting platform 15 along the track system 10, and the pulley assembly 245 is switched from a supporting state to a retracted state slowly, and the lifting platform 15 is lifted, so that the middle internal mold assembly 24 rises to the same height as the supporting frame 22.

Then, the side internal mold trolley 3 and middle internal mold trolley 2 are moved along the track system 10, so that the side internal mold trolley 3 is moved through the side groove 11 of the fixed end mold 1 and inserted into the pouring position 5, and the middle internal mold trolley 2 is moved through the middle groove 12 of the fixed end mold 1 and inserted into the pouring position 5. When the supporting frame 22 wholly penetrates through the middle groove 12, the middle fixed internal mold assembly 23 enters the pouring position 5 together with the supporting frame 22. The front end of the supporting frame 22 is moved below the middle movable internal mold assembly 24, then the lifting platform 15 is lowered down slowly, so that the inner plate 242 of the middle movable internal mold assembly 24 is snap connected with the supporting frame 22. The universal wheels 248 of the pulley assembly 245 is lowered onto the top surface of the supporting frame 22, and the middle movable internal mold assembly 24 is immediately moved into the pouring position 5, thereby finishing the mounting operation of the middle internal mold trolley 2.

Subsequently, four side formwork components 34 of the side internal mold trolley 3 are spliced into the side internal mold driven by the diagonal cylinder 33. Then, the middle fixed internal mold assembly 23 and the middle movable internal mold assembly 24 are pushed outward, and the top internal formwork 241 is driven upward by the top cylinder 2421. Further, the side internal formwork 244 is driven by the side cylinder 2422 to move laterally, and then the bottom internal formwork 244 is driven downwards by the bottom cylinder 2423, so as to form the middle internal mold together with the top internal formwork 241 and the side internal formwork 244. Then, the steel formwork 8 is fixed between the middle fixed internal mold assembly 23 and the middle movable internal mold assembly 24 to prevent concrete from entering into the middle movable internal mold assembly 24 and the middle fixed internal mold assembly 23.

S4: Closing the End Opening of the Pouring Position 5 and Pouring the Segmental Beam 14

When pouring the first segmental beam 14 in each production machine, the fixed end mold 1 of the other production machine is used as the end formwork of the end opening of the pouring position 5. For pouring a subsequent segmental beam 14, the previous poured and formed segmental beam 14 is used as the end formwork to form a circumferentially closed pouring cavity, in which the concrete is poured and waits for forming.

S5: Demolding of the Segmental Beam 14

The end formwork at the end opening of the pouring position 5 is removed, or the segmental beam 14 as the end formwork is moved out via the bottom mold trolley 9. The four side formwork components 34 of the side internal mold trolley 3 are gathered towards the horizontal frame 32 driven by the diagonal cylinder 33. The bottom internal formwork 243, the side internal formwork 244 and the top internal formwork 241 of the middle internal mold trolley 2 are gathered towards the supporting frame 22 successively driven by the cylinder, and then the middle movable internal mold assembly 24 is immediately slided to the front of the supporting frame 22. The lifting platform 15 is lifted to lift the middle movable internal mold assembly 24 away from the supporting frame 22, and then the middle internal mold trolley 2 and the side internal mold trolley 3 are moved out of the pouring position 5 to finish the demoulding.

S6: Removing the Segmental Beam 14

After pouring the segmental beam, the two production machine move the poured and formed segmental beams out of the pouring position successively via the bottom mold trolley. The specific steps for removing the segmental beam out of the pouring position are as follow.

The lifting platform 15 is lowered down until the track system 10 on the surface of the lifting platform 15 is docked with the track system 10 of the construction ground. The pulley assembly 245 of the middle movable internal mold assembly 24 is switched from the supporting state to the retracted state slowly. Then the middle movable internal mold assembly 24 is moved to the temporary track 103 along the track system 10 ready for next use. The poured and formed segmental beam 14 is removed out of the pouring position 5 by moving the trolley, transferred to the longitudinal track 102 at the transfer point, and transported to the storage area. The pouring steps of the segmental beams 14 and then the removing steps of the segmental beams 14 are successively performed in the two production machines, so that the segmental beams 14 are continuously, orderly and alternatively removed, providing increased production efficiency.

The above are the preferred embodiments of the present application, which are not intend to limit the protection scope of the present application. Therefore, all equivalent changes made according to the structure, shape and principle of the present application should be covered within the protection scope of the present application.

What is claimed is:

1. A double production line of a segmental beam, comprising two production machines and a track system provided on a construction ground; the production machine comprises a fixed end mold, two side molds, a bottom mold trolley, a middle internal mold trolley and two side internal mold trolley; the two side molds are positioned on two sides of the fixed end mold respectively, the fixed end mold and the two side molds together define a pouring position with an end opening, and the end openings of two pouring positions are arranged facing each other; the track system comprises a transverse track and a longitudinal track communicated with each other, both of the two pouring positions are positioned in an extension path of the transverse track, and the longitudinal track is positioned between two pouring positions; the bottom mold trolley is slidable in the track system; a middle groove and two side grooves run though the fixed end mold horizontally, the middle internal mold trolley penetrates through the middle groove and is inserted into the pouring position, the side internal mold trolley penetrates through the side groove and is inserted into the pouring position, and the end opening of the pouring position is closed via an end formwork; and, in either of the production machines, the fixed end mold, the two side molds, the bottom mold trolley, the middle internal mold trolley and the two side internal mold trolleys together define a pouring cavity in the pouring position;

wherein the side internal mold trolley comprises a side trolley, a horizontal frame provided on an upper end of the side trolley and four side formwork components, and a length direction of the horizontal frame is in line with a sliding direction of the side trolley; four side formwork components are circumferentially distributed around the horizontal frame by taking a length direction of the horizontal frame as axis, and the horizontal frame is provided with a side driving member configured to drive the four side formwork components to gather together or depart from each other; and, when the four side formwork components depart from each other, the four side formwork components are spliced with each other to form a side internal mold.

2. The double production line of a segmental beam according to claim 1, wherein the middle internal mold trolley comprises a middle trolley, a supporting frame provided on a top end of the middle trolley, a middle movable internal mold assembly and a middle fixed internal mold assembly; a gap is provided at the pouring position between the middle movable internal mold assembly and the middle fixed internal mold assembly, and configured to form a reinforcing rib in a middle chamber of the segmental beam when pouring the segmental beam.

3. The double production line of a segmental beam according to claim 2, wherein the middle movable internal mold assembly comprises a concave inner plate, a top internal formwork, a bottom internal formwork and two side internal formworks, the inner plate is snap connected with the supporting frame slidably, a middle driving member is provided in the inner plate and configured to drive the top internal formwork, the bottom internal formwork and the two side internal formworks to gather together or depart from each other; and, when the top internal formwork, the bottom internal formwork and the two side internal formworks depart from each other, the top internal formwork, the bottom internal formwork and the two side internal formworks are spliced with each other to form a middle internal mold.

4. The double production line of a segmental beam according to claim 3, wherein a pulley assembly is provided on a bottom wall of the inner plate, and is slidable along an extension direction of the supporting frame.

5. The double production line of a segmental beam according to claim 3, wherein the construction ground is provided with a recess, the recess is positioned outside the pouring position, a lifting platform is provided in the recess, and the lifting platform lifts the middle movable internal mold assembly to a same height as the supporting frame; and, when the supporting frame wholly passes through the middle groove, a front end of the supporting frame is moved to directly above the recess and the front end of the supporting frame is snap connected with the inner plate slidably.

6. The double production line of a segmental beam according to claim 4, wherein there are four pulley assemblies, the pulley assembly comprises a connecting rod hinged inside the inner plate, a universal wheel mounted on the moving end of the connecting rod and an obliquely supporting cylinder hinged inside the inner plate, a piston rod of the obliquely supporting cylinder is hinged with the connecting rod, the obliquely supporting cylinder is configured to retract or stretch the connecting rod, and, when the connecting rod is in a stretched state, the middle movable internal mold assembly are supported away from the construction ground by four connecting rods.

7. The double production line of a segmental beam according to claim 5, wherein the track system covers a surface of the lifting platform, and, when the surface of the lifting platform is moved to be flush with the construction ground, the track system of the lifting platform is docked with the track system of the construction ground.

8. A double production line of a segmental beam, comprising two production machines and a track system provided on a construction ground; the production machine comprises a fixed end mold, two side molds, a bottom mold trolley, a middle internal mold trolley and two side internal mold trolley; the two side molds are positioned on two sides of the fixed end mold respectively, the fixed end mold and the two side molds together define a pouring position with an end opening, and the end openings of two pouring positions are arranged facing each other; the track system comprises a transverse track and a longitudinal track communicated with each other, both of the two pouring positions are positioned in an extension path of the transverse track, and the longitudinal track is positioned between two pouring positions; the bottom mold trolley is slidable in the track system; a middle groove and two side grooves run though the fixed end mold horizontally, the middle internal mold trolley penetrates through the middle groove and is inserted into the pouring position, the side internal mold trolley penetrates through the side groove and is inserted into the pouring position, and the end opening of the pouring position is closed via an end formwork; and, in either of the production machines, the fixed end mold, the two side molds, the bottom mold trolley, the middle internal mold trolley and the two side internal mold trolleys together define a pouring cavity in the pouring position;

wherein the middle internal mold trolley comprises a middle trolley, a supporting frame provided on a top end of the middle trolley, a middle movable internal mold assembly and a middle fixed internal mold assembly; a gap is provided at the pouring position between the middle movable internal mold assembly and the middle fixed internal mold assembly, and configured to form a reinforcing rib in a middle chamber of the segmental beam when pouring the segmental beam.

9. The double production line of a segmental beam according to claim 8, wherein the middle movable internal mold assembly comprises a concave inner plate, a top internal formwork, a bottom internal formwork and two side internal formworks, the inner plate is snap connected with the supporting frame slidably, a middle driving member is provided in the inner plate and configured to drive the top internal formwork, the bottom internal formwork and the two side internal formworks to gather together or depart from each other; and, when the top internal formwork, the bottom internal formwork and the two side internal formworks depart from each other, the top internal formwork, the bottom internal formwork and the two side internal formworks are spliced with each other to form a middle internal mold.

10. The double production line of a segmental beam according to claim 9, wherein a pulley assembly is provided on a bottom wall of the inner plate, and is slidable along an extension direction of the supporting frame.

11. The double production line of a segmental beam according to claim 9, wherein the construction ground is provided with a recess, the recess is positioned outside the pouring position, a lifting platform is provided in the recess, and the lifting platform lifts the middle movable internal mold assembly to a same height as the supporting frame; and, when the supporting frame wholly passes through the middle groove, a front end of the supporting frame is moved to directly above the recess and the front end of the supporting frame is snap connected with the inner plate slidably.

12. The double production line of a segmental beam according to claim 10, wherein there are four pulley assemblies, the pulley assembly comprises a connecting rod hinged inside the inner plate, a universal wheel mounted on the moving end of the connecting rod and an obliquely supporting cylinder hinged inside the inner plate, a piston rod of the obliquely supporting cylinder is hinged with the connecting rod, the obliquely supporting cylinder is configured to retract or stretch the connecting rod, and, when the connecting rod is in a stretched state, the middle movable internal mold assembly are supported away from the construction ground by four connecting rods.

13. The double production line of a segmental beam according to claim 11, wherein the track system covers a surface of the lifting platform, and, when the surface of the lifting platform is moved to be flush with the construction ground, the track system of the lifting platform is docked with the track system of the construction ground.

* * * * *